United States Patent [19]

Caffes

[11] 4,292,121
[45] Sep. 29, 1981

[54] SOLID/LIQUID SEPARATION THROUGH LIQUID VAPORIZATION AND CONDENSATION, AND APPARATUS THEREFOR

[75] Inventor: Peter J. Caffes, Silver Spring, Md.

[73] Assignee: The Caffes Trust, Washington, D.C.

[21] Appl. No.: 77,555

[22] Filed: Sep. 21, 1979

[51] Int. Cl.³ ............................................. B01D 1/16
[52] U.S. Cl. ................................ 159/3; 159/DIG. 16; 159/24 A; 159/48 R; 202/205; 203/24
[58] Field of Search ...... 159/3, 24 A, 24 R, DIG. 16, 159/48 R; 203/24, 26, 405

[56] References Cited

U.S. PATENT DOCUMENTS

| | | | |
|---|---|---|---|
| Re. 24,469 | 5/1958 | Reinert | 159/24 R |
| 1,966,938 | 7/1934 | Stone | 159/24 |
| 2,444,527 | 7/1948 | Pomeroy | 159/24 R |
| 2,619,453 | 11/1952 | Andersen | 159/24 |
| 3,147,201 | 9/1964 | Nickerson | 159/24 |
| 3,275,532 | 9/1966 | Harper | 203/26 |
| 3,471,373 | 10/1969 | Pottharst, Jr. | 159/24 R |
| 3,597,329 | 8/1971 | Brown | 159/24 |
| 3,637,465 | 1/1972 | Wilson | 203/26 |

*Primary Examiner*—Norman Yudkoff
*Attorney, Agent, or Firm*—Berman, Aisenberg & Platt

[57] ABSTRACT

A solids/liquid admixture is introduced into an atmosphere (temperature and reduced pressure) in which the liquid is immediately converted to a saturated vapor and thus relieved of associated solids, which are withdrawn. The saturated vapor is then conducted to a surface on which it condenses and from which it is collected. Suitable apparatus is provided in the form of modules, which are efficiently operated in multiples of four in a common temperature-stabilizing medium.

39 Claims, 20 Drawing Figures

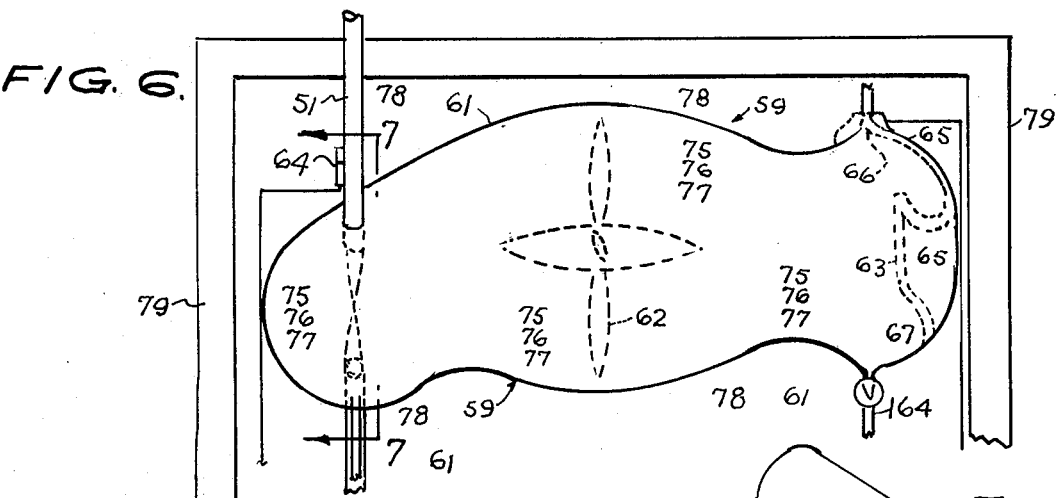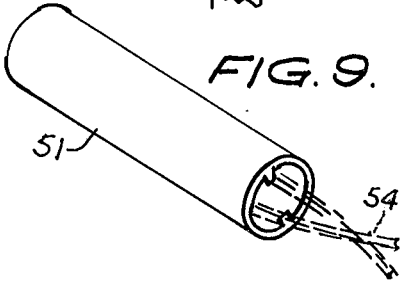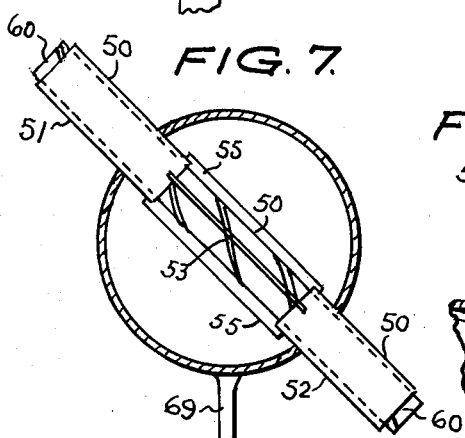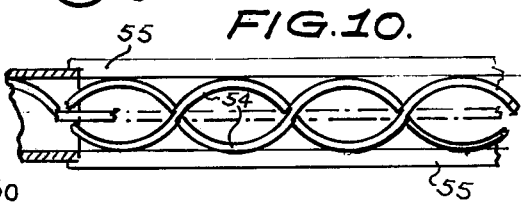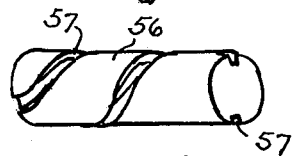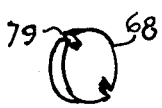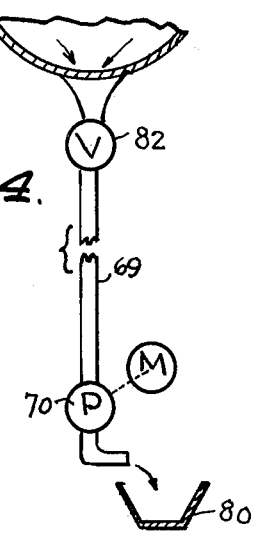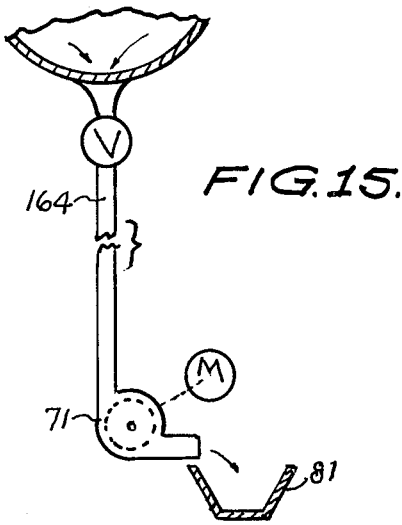

SOLID/LIQUID SEPARATION THROUGH LIQUID VAPORIZATION AND CONDENSATION, AND APPARATUS THEREFOR

THE TECHNICAL FIELD

Liquids are separated from solids by vacuum evaporation in a process and associated apparatus which permit application to such diverse materials as oil-bearing shale and ordinary household waste (garbage and sewage).

BACKGROUND

There have been many diverse separation methods beyond those normally found in standard texts. Diverse evaporators and dryers have been employed to effect separation of liquids from solids with which they are admixed or otherwise associated.

Although "distillation" is commonly used in the sense of vaporizing a single constituent from a solution, e.g., in distilling water, the term is properly applied only where vaporization of a liquid mixture yields a vapor phase containing more than one constituent, and it is desired to recover one of more of these constituents in a nearly pure state. Thus, the process of separating liquids from solids by vaporizing the liquid is properly referred to as evaporation or drying.

Stone (U.S. Pat. No. 1,996,938) provides a "Method of Distillation" and associated apparatus. His operation is designed to be effected at near room temperature and at reduced pressure, e.g. 17.363 mm. of mercury. Purification of water is thus effected by vaporization and condensation.

Andersen (U.S. Pat. No. 2,619,453) relates to a method for liquid evaporation and solid concentration. The liquid to be evaporated is forceably circulated through one part of a heat exchanger, in another part of which the vapors are condensed after having been subjected to a compression.

Nickerson (U.S. Pat. No. 3,147,201), like Andersen, refers to "Vapor Compression Distillation ". He provides apparatus which uses natural gravitational currents to remove concentrated solution from an evaporation chamber, which is very compact in relation to its capacity. A single vacuum pump or compressor is used to raise the solution to the evaporation chamber, to lower the saturation temperature of the solution and to compress vapors evolved from the solution to provide heat necessary for continuous evaporation.

Harper (U.S. Pat. No. 3,275,532) relates to evaporating and condensing a liquid, e.g., for condensing fresh water from sea water. Water vapor is evaporated from sea water into a confined space which is at a certain pressure. An equilibrium is established between the sea water and the vapor in a confined space. Water is condensed from the vapor phase by increasing pressure on the confined space. Condensed water is then removed.

Brown (U.S. Pat. No. 3,597,329) effects evaporation by distributing feed liquid onto a plurality of opposite-facing substantially-parallel and substantially-vertical surfaces. Between neighboring oppositely-facing surfaces he establishes a vapor zone for evaporation and vapor removal.

Wilson (U.S. Pat. No. 3,637,465) is also primarily concerned with making potable water from sea water or water otherwise contaminated with impurities. He provides a distillation system in which heat flows from fluid being cooled to fluid being heated in a manner which is essentially recirculating counterflow exchange.

STATEMENT OF INVENTION

Economic liquid extraction and liquid separation from solids are effected in a manner which takes advantage of a combination of factors in a way designed to increase efficiency and economy. The "flywheel" effect of liquid evaporating (expanding with cooling) at one end a chamber and condensing (contracting with heating) at the other end of a chamber is used to convey vapor (maintained in a saturated condition) completely through a chamber from an inlet to a condensing surface from which condensate is withdrawn from the chamber and produced heat is radiated back to the inlet. Solids (associated with influent liquid, which evaporates on introduction into the chamber), which are not supported by the saturated vapor in the chamber, fall out near the inlet and are removed from the chamber through a discharge means provided for that purpose.

An object of the invention is to provide a chamber wherein introduced liquid is (on entry) converted into saturated-vapor form, in which it is maintained throughout the chamber other than at the condensation surface. A further object is to maintain the cross-sectional flow path and pressure constant throughout the chamber. A still further object is to provide a condensing surface at an end of the chamber remote from the inlet. A still further object is to radiate heat from the condensing surface or from the chamber end wall (closest to the outlet) to the inlet. An additional object is to employ the "flywheel" effect of evaporating and condensing liquid to move saturated vapor continuously from the inlet to the condensing surface. Another object is to maximize temperature stability throughout each chamber by combining modules in a common medium maintained at substantially uniform temperature. Still further objects include maintaining saturated vapor in each module at substantially constant temperature and pressure. Additional objects are apparent from the following description.

BRIEF DESCRIPTION OF THE DRAWINGS

FIG. 6 is a vertical cross-section of a module designed for processing a liquid-containing solid.

FIG. 7 to FIG. 15 relate to the module of FIG. 6.

FIG. 7 shows the feeding mechanism for introducing prepared solids into the module of FIG. 6.

FIG. 8 is the cross-section of the feeding mechanism of FIG. 7.

FIG. 9 is a perspective view of part of the feeding mechanism of FIG. 7.

FIG. 10 is a partially schematic cross-section of the feeding mechanism of FIG. 9.

FIG. 11 is a cross-section of the feeding mechanism of FIG. 9.

FIG. 12 is a perspective view of shaped solid fee.

FIG. 13 is an isometric view of a divider.

FIG. 14 is a partially schematic cross-section of the solids discharge.

FIG. 15 is a partially schematic cross-section of the condensate discharge.

DETAILS

Figure 1:
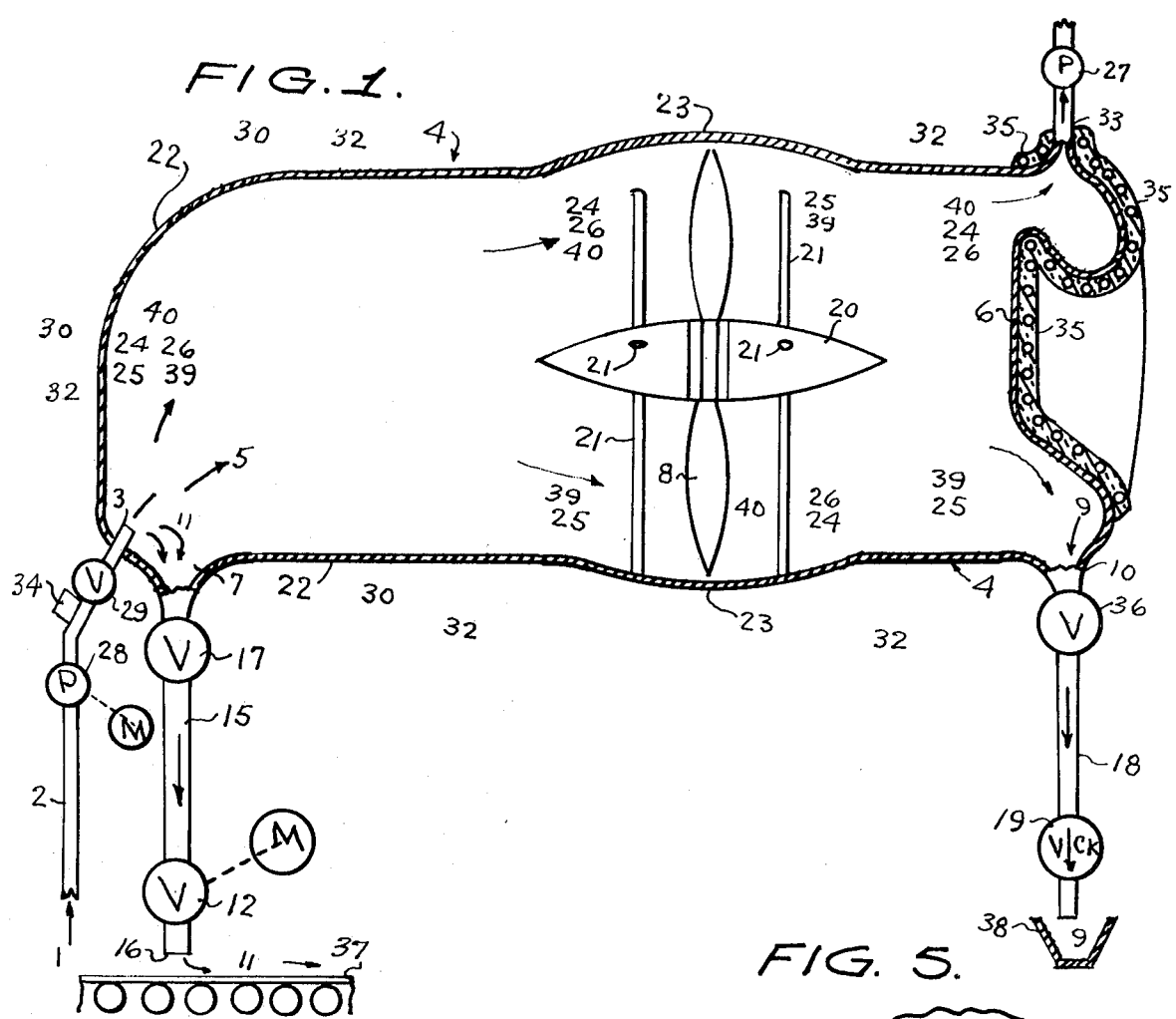
FIG. 1 is a vertical cross-section of a module designed for processing a flowable solid/liquid admixture.

The present invention has a number of interrelated aspects, all of which are substantially based upon a saturated-vapor chamber with an inlet at one end, an outlet and condensation surface at the other end and a substantially-constant cross-sectional-free area therebetween. During operation, entering liquid is immediately vaporized and maintained in the form of saturated vapor at a substantially constant temperature and pressure as it is transmitted to a condensation surface on which it is condensed and from which it passes through a drain from the chamber. Heat from the condensing surface is radiated back to the feed, where it assists in the evaporation of incoming liquid.

The size of such evaporation and condensation chambers varies over a considerable range. Such chambers vary in length from 15 to 60 feet (4.6 to 18.3 meters) and in diameter from 4 to 20 feet (1.2 to 6.1 meters). The ratio of length to diameter ranges from about 1, preferably about 2.5, to about 4. The optimum chamber has a length of 30 feet (9.1 meters) and a diameter of 12 feet (3.7 meters). Thus, chambers of each of the following lengths (in feet) have diameters (in feet) approximately equal to that indicated parenthetically 15 (4); 16 (5); 18 (6); 20 (7); 22 (8); 24 (9); 26 (10); 28 (11); 30 (12); 33 (13); 36 (14); 40 (15); 44 (16); 48 (17); 52 (18); 56 (19); 60 (20). Each of the preceding pairs of dimensions is merely illustrative of suitable dimensions and is not in any way limitative thereof. The smaller-sized units are useful, e.g., for disposal of human and other waste materials on ships, whereas the larger units are suitable for similar use for a sizable municipality. It is preferred to use multiples of units having a length of about 30 feet rather than to use modules of a larger size.

The effected separation by evaporation and condensation is applicable to a large variety of materials, including many different types of industrial wastes, as well as producing distilled water from sea water.

The modules and/or units are relatively inexpensive to construct; they require little energy to operate; and they are simple and economical to maintain. Under current economic conditions they are cost effective.

The process is effectively utilized to produce distilled water from virtually any aqueous source; to recover metals, chemicals, salts, fertilizers and fuels; to refine petroleum products; to clean up industrial waste and waterways; to reclaim land for agriculture by fertilization and/or irrigation; to prepare safe solutes for medicines and research products; and to sterilize at low temperatures when working with heat-sensitive matter. End-products include rich fertilizers, minerals, pure water, metals, petroleum derivatives, pseudo-slag residues and vaccines.

The inlet portion of the respective modules or chambers vary slightly in design based on the type of influent. When the charge is liquid in nature, a module of the type depicted in FIG. 1 is employed, whereas a module of the type shown in FIG. 6 is used for a shaped-solid charge.

Aspects of the invention include maintaining individual modules in an insulated fluid medium for temperature control and heat conservation. Also, multiple modules (preferably 4) are included in a single insulated unit in a head-to-tail arrangement for the purpose of conserving energy and maintaining constant temperature.

Throughout the following disclosure and claims solids and any other matter which separate from liquid on evaporation of the latter are referred to as pycno, irrespective of their actual composition; "pycno" is thus used herein to indicate a concentrate.

FIG. 1 illustrates a module provided for treating a liquid influent, such as sanitary sewage (including, e.g., human waste, garbage and other household sewage). Alternatively, the liquid influent is of any of other diverse sources and optionally includes additives, such as catalysts and stabilizers. The influent is optionally strained, flocculated or mixed with other fluids. Best results are obtained by stabilizing the influent temperature prior to processing. Such temperature is preferably about room temperature (20° C), but optionally varies from below 0° to in excess of 250° C. Processing is effected in a medium vacuum (25 to $10^{-3}$ mm of Hg.).

Influent 1, with or without any preparatory treatment, passes through conduit 2 and nozzle 3 into evaporator 4, in which an environment is established to maintain a saturated vapor condition for any particular influent 1. The influent 1 is sucked from nozzle 3 by the reduced pressure throughout the interior of evaporator 4. The momentum resulting from vaporization of influent 1 on its introduction into the evaporator through nozzle 3 propels the vapor 5 toward a condensing surface 6. It also propels any non-vaporized substance (pycno) associated with the influent toward a collector 7.

A fan 8, preferably positioned at or about the midpoint in the saturated vapor path from the influent inlet to the condenser, is provided to assist in obtaining saturated-vapor conditions throughout module 4 when the evaporator is first placed into operation and is subsequently used whenever needed to promote movement of saturated vapor from the inlet end toward the condenser and to maintain contant operating conditions.

As saturated vapor contacts condenser 6, it condenses into liquid 9, which passes into drain 10. On condensation, the vapor volume shrinks dramatically from tens of thousands to one, thereby continually making room for the entry of new vapor being formed as the influent passes through nozzle 3. Sufficient influent is passed into the evaporator to maintain a saturated vapor environment throughout. Once saturated conditions are reached throughout the entire module, the condensation at the condenser has a flywheel effect in assisting the passage of vapor from nozzle 3 toward condenser 6.

Liquid formed on the condenser surface runs down and around condenser 6 and into drain 10 for removal. The heat of condensation (exothermic reaction) is radiated from the condenser surface to nozzle 3 in approximately 3 ten millionths of a second, furnishing heat for vaporization (endothermic reaction).

Dissolved and/or colloidal and/or other matter 11 associated with influent, but not vaporized therewith, falls out immediately below or downstream of nozzle 3 and into collector or drain 7 by gravity. When the weight of collected pycno 11 exceeds atmospheric pressure, it pushes through a uni-directional valve 12, which seals the outlet of collector 7. This continues as long as pycno continues falling out.

The consistency of pycno is subject to extreme variations which are primarily dependent upon the nature of influent being processed at any particular time. However, even in the processing of a single-source influent, such as household sewage, often leads to the production of diverse types of pycno. Maintaining pycno flow through discharge pipe 15 and valve 12 is apt to present difficulty, particularly when the pycno is of a form which tends to bridge, cake or otherwise clog the passage of discharge pipe 15. The reduced pressure within the chamber of module 4 further contributes to this difficulty, as it constitutes a force which deters the flow of pycno toward and through valve 12.

Among conventional ways of overcoming such a problem is provision of an axially-rotated screw conveyor 100 within discharge pipe 15 to transmit collected pycno positively therethrough and to push it through valve 12. Valve 12 is thus opened only by pycno being forced through it by the screw conveyor, which is operated continuously during any run.

Valve 12 is spring biased. When no pycno is being generated, atmospheric pressure also contributes to keeping outlet 16 shut and sealed. An emergency shut-off valve 17 is provided at the top (chamber end) of discharge pipe 15.

Figure 2:
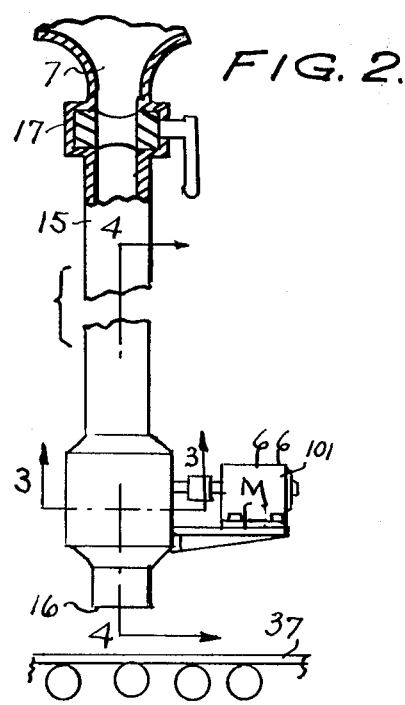
FIG. 2 is a partially schematic cross-section of the solids discharge of the module of FIG. 1.
Figure 5:
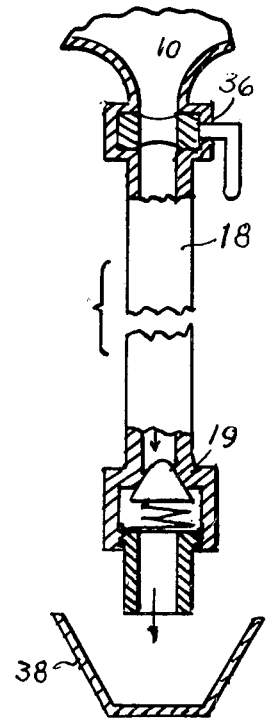
FIG. 5 is a partially schematic cross-section of the condensate discharge of the module of FIG. 1.
Figure 4:
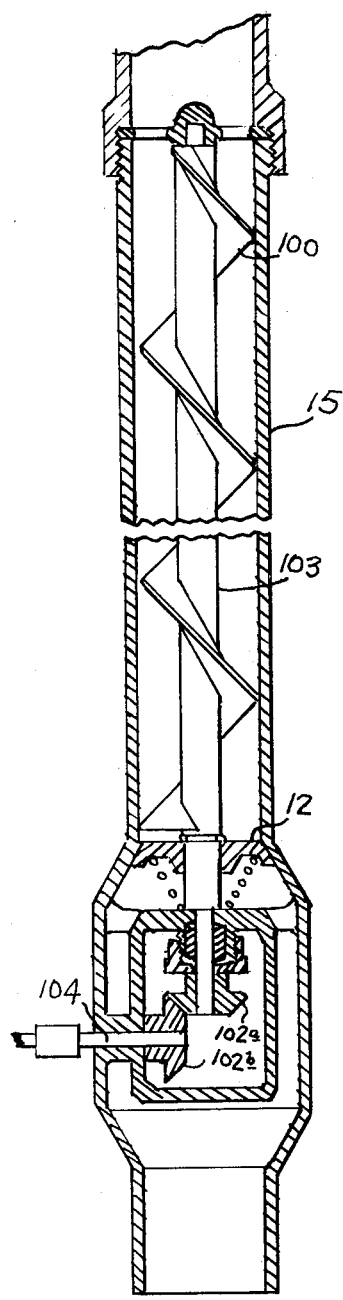
FIG. 3 and FIG. 4 illustrate one form of conveying means for the solids discharge.
Figure 19:
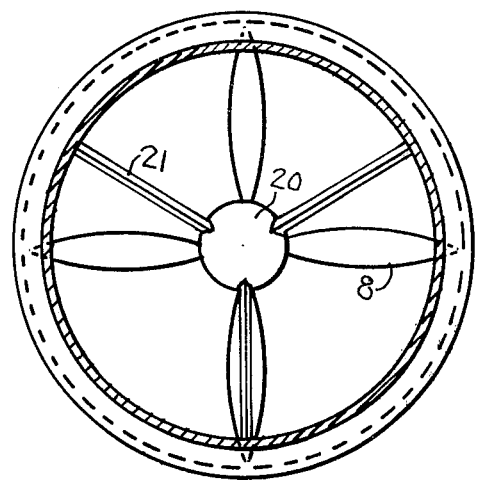
FIG. 19 is a cross-section of module 4 showing supports 21 and one form of volume mover 8.
Figure 20:
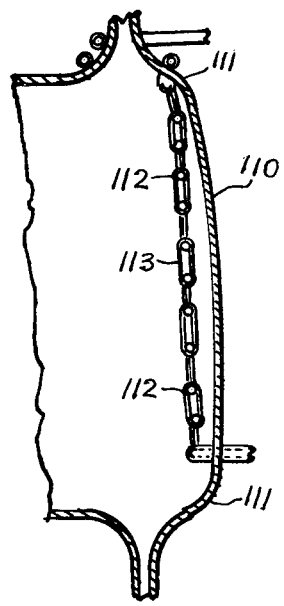
FIG. 20 is a partial cross-section of the outlet end of a module with an alternative condensing surface.
Figure 3:
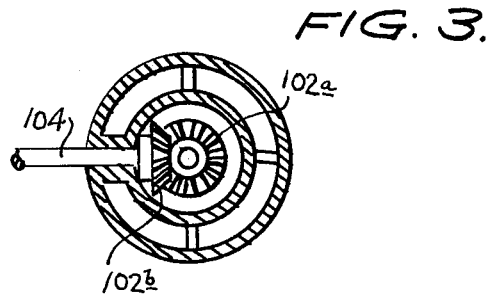

With reference to FIGS. 2 to 4, screw conveyor 100 is driven, e.g., by a motor 101. Worm gears 102a and 102b are directly connected to an axial shaft 103 of the screw conveyor and to the motor drive shaft 104.

The liquid condensate, effluent 9, is collected at the outlet end of the module in drain 10. Drain pipe 18 has a valve 19 which closes when condensation ceases, thus preventing evaporation of effluent 9. The outlet pipe 18 collects condensate 9 until the effluent weight exceeds atmospheric pressure, at which time one-way valve 19 is opened to permit continuous passage therethrough of effluent 9 until condensation ceases. In view of the reduced pressure within module 4, atmospheric pressure keeps outlet valve 19 closed and sealed when the weight of condensate in drain pipe 18 is inadequate to open it.

For most efficient operation of the module, fan 8, which has, e.g., from 2 to 6 or more blades, is mounted on a shaft (not shown) of motor 20; the housing of motor 20 is secured (on each side of the fan) by a Y-frame 21 to the module wall 22. Wiring for motor 20 passes through one of the legs of Y-frame 21 to the outside of the module and to a suitable source of electricity.

In order to avoid diminishing the cross-sectional area of the flowpath of saturated vapor between nozzle 3 and condenser 6, the wall 22 of the module is bulged outwardly at 23 (surrounding motor and motor housing 20). The bulge is designed to maintain a virtually-constant cross-sectional area for the flow of saturated vapor from one end of the module to the other.

To facilitate operation of the evaporator, rugged instrumentation with extremely sensitive sensors is provided for instant relay of miniscule variations in temperature (thermometer 24) and pressure (pressure gauge 25) to an operator or to a programmed computer to maintain a saturated-vapor environment at substantially constant temperature and pressure throughout the interior of module 4. A non-fluctuating power source (not shown) is also advantageous for maintaining optimum conditions.

A volume mover (fan 8) is powered by a well-grounded electric motor 20. The volume mover 8 is designed to convey 100 percent of the vapor produced from influent 1 (under saturated conditions) from nozzle 3 to the condensing surface 6, whenever assistance in moving such vapor is required. The operation of the volume mover is controlled, e.g., by an operator or by a computer which receives signals from sensors as to vapor density (vapor gauges 26) and temperature (thermometers 24). Fan 8 is turned on, slowed down, sped up or turned off as required to insure a saturated-vapor condition throughout the interior of module 4 and a constant flow of saturated vapor from inlet nozzle 3 to condenser 6. Similarly, a vacuum pump 27 is optionally activated manually by an operator or by direction from a computer to reduce pressure within module 4 whenever such is necessary to maintain the vapor therein at a saturated condition.

A water pump 28 and a valve 29 (provided in conduit 2) are controlled either by an operator or by a computer to increase, decrease, turn on or cut off flow of influent through nozzle 3; such control is necessary to maintain a saturated-vapor condition throughout the interior of module 4. Fluid influent is advantageously conducted through conduit 2 to nozzle 3 by atmospheric pressure.

The operation of module 4, controlled by an operator or by a computer for optium efficiency with minimum energy input to sustain a saturated pressure condition, involves variation of influent/flow and of effluent (condensate 9) flow, increasing the transport of saturated vapor by volume mover 8, and increasing or decreasing pressure or temperature.

Additionally, each module 4 is completely surrounded by liquid 30, e.g. a deaerated incompressible aqueous solution that has a high specific heat, completely contained within an insulated shell 31.

Figure 16:
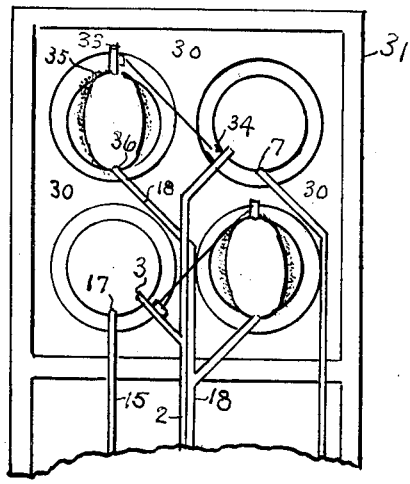
FIG. 16 is a vertical cross-section (end view) of four modules (as shown in FIG. 1) as a single unit in a common shell.
Figure 17:
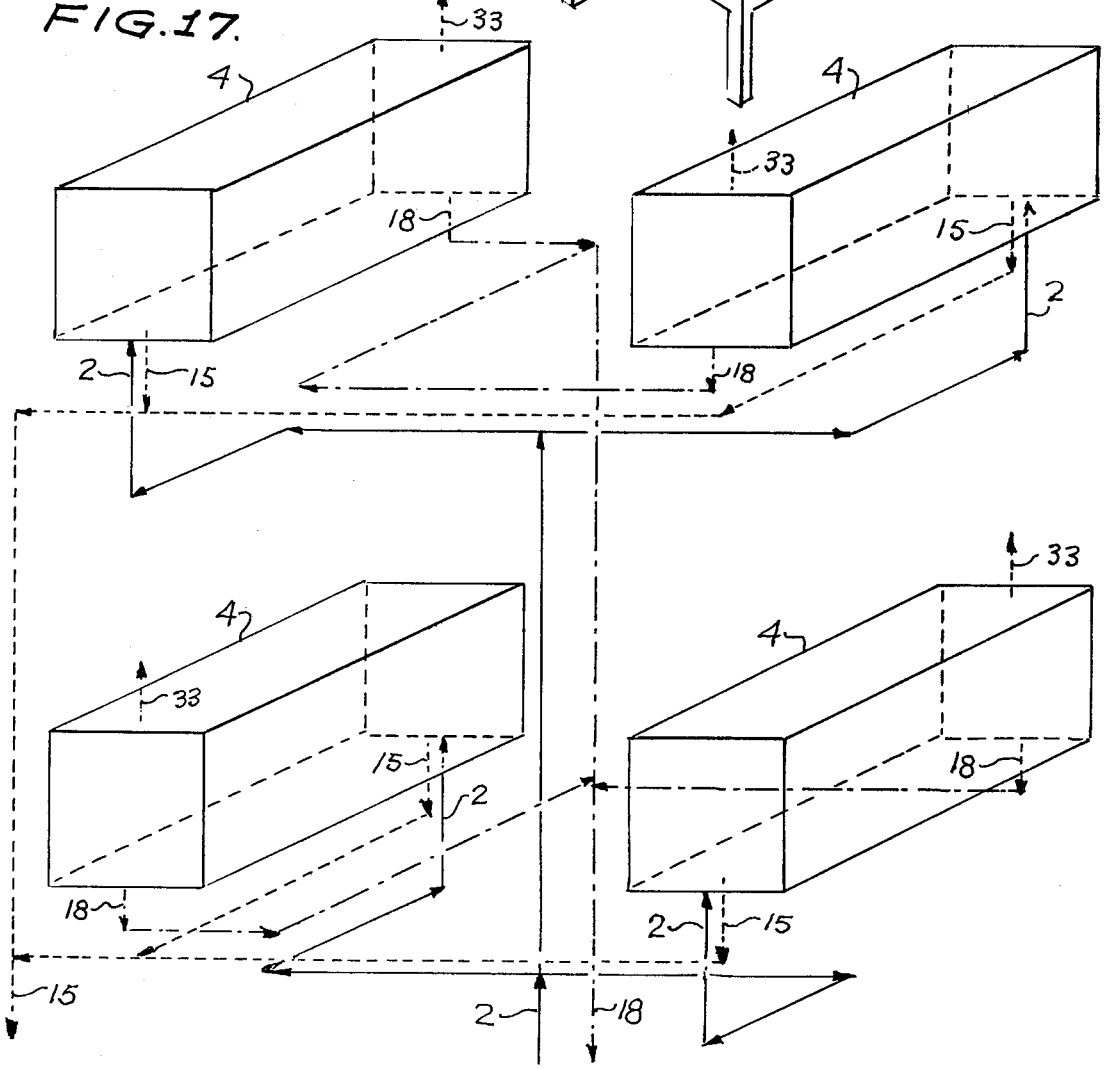
FIG. 17 is an isometric schematic view of the four modules shown in FIG. 16.

To help maintain a temperature balance, process chambers 4 are advantageously made in units of four, as shown in FIGS. 16 and 17, in which the nozzle or inlet end of each is adjacent, above or below the outlet of condenser end of another. Propeller agitators 32 are positioned throughout liquid filler medium 30 to circulate such medium and force convection whenever such is necessary or desired for optimum operation.

Whether a single module or multiple modules are included in a single assembly, such assembly is advantageously insulated by an insulating shell 31. When plural modules are included in a single assembly, the respective inlets and outlets are either separately controlled or combined in any suitable fashion. For example, the inlets of modules facing in the same direction can be joined together, and the corresponding outlets can be arranged in the same fashion; this is illustrated in FIG. 16. An alternative arrangement is one wherein all inlets are fed from a common influent line and all condensate is collected in a common drain; such is illustrated by FIG. 17. Any combination of arrangements for influent, pycno or condensate handling can be suitably arranged without departing from the essence of the instant invention.

The exhaust pipe 33 and immediate surrounding area are advantageously refrigerated along with condensing surface 6. Refrigeration around the exhaust-pipe exit prevents readily condensable vapors from passing into and through the exhaust pump 27. Any condensation of such vapors within vacuum pump 27 may unduly increase maintenance of such pump. Refrigerant (employed for cooling the noted surfaces) is condensed by a heat-pump compressor 34 on influent conduit 2. This compressor heats influent 1 on its way to nozzle 3.

When a heat pump is used, the compression or heating cycle is employed to heat influent and the vaporizing or cooling cycle is employed to cool the exhaust outlet and the condensing surface. The positioning of the coolant is indicated at 35. When plural modules 4 are in head-to-tail position in the same insulating shell, the heat-pump compressor in the inlet of one module advantageously connected to the heat-pump evaporator for the condenser of the adjacent module, and vice versa. This arrangement (shown in FIG. 16) is more convenient than having a separate heat pump for each module.

The coolant 35 is advantageously positioned and conveyed through thin walled tubes surrounding and immediately adjacent the exhaust outlet and virtually covering the entire back of the condenser.

The condenser need not be shaped as shown in FIGS. 1 and 6, which are merely illustrative of the preferred design. In an alternative design the wall 110 at the outlet end of the chamber is substantially flat and vertical except for its dish-shaped edges 111 which provide a concave effect from the inside of the chamber. A wall of this type has a larger surface radiating heat directly through the chamber toward the inlet end.

When such a flat outlet-wall design is used, the condenser is advantageously also provided in a different form. Such condenser is, e.g., constructed of transparent thin-walled plastic (or glass) tubing 112 arranged within the chamber on or in a clear wall 113 and transparent tempered-float-glass substantially parallel to the flat outlet wall and separated therefrom by about 1.25 centimeters. Such tubing may present a vertical cross-sectional area which is virtually coextensive with that of the flat outlet wall. By having the tubing and wall transparent and colorless, heat of condensation produced at its surface is radiated by the flat end wall directly through the transparent wall and tubing toward the inlet end. Coolant is advantageously conveyed continuously through the condenser tubing.

The effluent (condensate) and pycno are utilized, sold, discarded, discharged or further processed as conditions dictate. The treatment of products and by-products of this process depend largely upon the nature of the influent.

A water-treatment plant for municipal sewage employs a 4-module unit, each module of which is approximately 30 feet long and 12 feet in diameter. The operating temperature within each unit is approximately 20° C. Although the theoretically-ideal operating pressure is 17.5 mm of Hg, the actual operating pressure is 15.2 mm of Hg, thus providing a 13-percent safety factor. A summary of working parameters is provided by the following table:

| Description | 4-Module Unit | Single Module |
| --- | --- | --- |
| Capacity [liters/day (l/d)] | 2,200,000 | 550,000 |
| Influent (l/d) | 2,200,000 | 550,000 |
| [kilograms/day (kg/d)] | 2,196,490 | 549,123 |
| [liters/minute (l/min)] | 1,527 | 382 |
| Effluent (l/d) | 1,760,000 | 440,000 |
| (kg/d) | 1,757,193 | 439,298 |

-continued

| Description | 4-Module Unit | Single Module |
| --- | --- | --- |
| (l/min) | 1,222 | 306 |
| Pycno [cubic meters/day (m³/d)] | 435 | 109 |
| (kg/d) | 439,297 | 109,824 |
| [cubic centimeters/minute (cc/min)] | 305,707 | 76,427 |
| Water Vapor (m³/min) | 7,056 | 1,764 |
| Heat* [calories/min (cal/min)] | 716,040,890 | 179,010,223 |

*Vaporization (endothermic) and Condensation (exothermic)

The utilization of this process in an ecological system of sewage recycling results in killing pathogens by exploding them from their own internal osmotic pressure. The process results in producing clean fuel (useful in the operation of the system) and a minimum of non-biodegradable gritty waste, which is readily separated. Pycno obtained from virus-containing influent is useful for the preparation of vaccines.

Each module of the subject 4-module unit accommodates a 10.7-kilowatt (kw) volume mover 8. A dependable fan-type unit, such as that manufactured by Joy Manufacturing Company of New Philadelphia, Ohio, is advantageously employed.

The use of a 4-module unit permits maintenance on or replacement of any module with a 25-percent reduction in production of pure clear water during a brief shutdown. With a dependable fan-type unit 8 maintenance shutdowns are years apart.

Each module has an intake shut-off valve 29 upstream of nozzle 3 on influent line 2 and a cut-off valve 17 on the pycno discharge pipe 15, as well as a similar valve 36 on the distillate or condensate drain 18. Each pycno line 15 empties onto a conveyor belt 37 through an outlet 16. The condensate line 18 of each module empties, e.g., into a reservoir, natural water course or conduit 38.

Each unit has a shell 31 of, e.g., reinforced fiberglass and a heat pump, e.g. a ty-chrome- or copper-tube heat exchanger 33, 34, with shells and tubes in parallel or pairs of the individual modules. A single heat pump thus operates between a compressor unit 34 on one module and the coolant 35 (for the condenser) on an adjacent module.

The head of influent 1 at nozzle 3 is determined by a combination of pressure from pump 28 and suction action of vacuum pump 27 and fly-wheel effect of condensing vapor on condenser 6. The rate of condensation is about 300 liters per minute for each unit, as compared with an influent-charge rate of about 380 liters per minute. Regulation of the processing rate is accomplished by feed-rate control on the influent, speed control of the volume mover 8 and/or pressure adjustment by the vacuum pump 27. Such pump is, e.g., a Kinney KS-13 vacuum pump (manufactured by Kinney Vacuum Division of New York Air Brake Co. of Boston, Mass.)

The process is conducted completely manually by a trained operator, completely automatically through conventional available computerized controls or any desired mix of these two modes. Any and all automation is advantageously accompanied by a manual override.

The recycler interior (module 4) is suitably constructed of, e.g., exhausted stainless steel or aluminum. The outer shell 31 is of conventional construction with an insulated layer of, e.g., a minimum of 25 centimeters of polyurethane or equivalent. The interior enclosed cavities (between shell 31 and each enclosed module 4)

are filled, e.g., with de-aerated water 30. Propeller agitators 32 are positioned within filler 30 for desired or required forced convection of the filler.

The operation of the recycler is simple; it is based on the fact that numerous liquids boil at 20° C. (or at a temperature not too remote therefrom) by proper adjustment of pressure. When the saturated vapor pressure over any such liquid is equal to or infinitesimally less than the internal pressure of such liquid, it boils (evaporation throughout the interior of the liquid).

The chamber of each module 4 is pre-evacuated to approximately 15 mm of mercury, creating a new environment. Influent 1 is allowed to enter the chamber at a premeasured rate; as it boils, vapor in the chamber becomes saturated. At this point any increase in volume causes boiling, and the pressure thereafter remains constant. Conversely, any decrease in volume causes condensation of the vapor, still with constant pressure. Momentum resulting from vaporization (at nozzle 3) propels resulting vapor toward the refrigerated condensing surface 6. As a backup volume mover 8 can, by itself, effect a continual decrease in volume at the nozzle 3 end, thus keeping the pressure constant at the inlet and allowing continuous boiling of influent. Concurrently, the volume at the outlet or condensing end is continually reduced in a ratio of 57,670 to 1 as water vapor liquefies on condenser 6. Heat exchange is effected radiantly, travelling from condenser wall 6 to the opposite wall (directly above nozzle 3) in 3 ten-millionths of a second. Coolant 35 (a colorless fluorinated hydrocarbon refrigerant, e.g. trichlorofluoromethane, dichlorofluoromethane and dichlorodifluoromethane) and associated piping and other structure further contribute to condensation so that condensed vapor remains in liquid state and is removed in that form. Influent 1 is preheated by compressor 34. This heat is used to help offset the cooling effect of the evaporation which produces coolant 35, thus allowing the process to continue more efficiently. The temperature and makeup of the influent is advantageously maintained fairly constant, but some variations are to be expected. Such variations are monitored by samplers 39 (suitably positioned throughout the module chamber) and the various gauges (24, 25, 26 and 40).

In preparing the injecting influent into the recycler, care should be taken to remove any grit from and to avoid aeration of the influent. Such influent is thereafter advantageously passed through a comminuter or hydrosieve and/or accorded other similar treatment before being discharged into a holding tank sized for maximum flow and having sufficient storage capacity to make available a continuous stream of influent to the recycler. The storage or holding tank is conveniently provided with a floating cover with collection grooves on its underside to capture any generated methane gas. Anaerobic activity should be encouraged. Screenings or sludge, whichever is applicable, should be removed at a predetermined and appropriate rate. The influent to be charged into the recycler is taken from the liquid zone, e.g., through the top of a funnel-type device so as to minimize inclusion therein of any gas of sediment. Upon entering the recycler, influent is already preheated to some degree of compressor 34 and radiation from condenser 6. The internal pressure of influent is sufficiently reduced so that it boils vigorously as it passed through nozzle 3. The water vapor is subsequently condensed, e.g., by condenser 6; the condenser is cooled by radiation, by some conduction and by coolant 35. The pycno 11 is treated in any one or combination of conventional ways to be converted into solid fuel or fertilizer.

Figure 18:
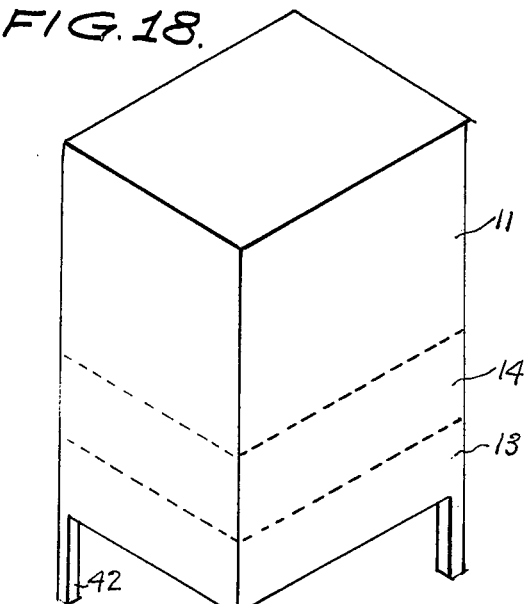
FIG. 18 is an isometric view of an illustrative structure for housing a 4-module complex and associated equipment.

An advanced water-treatment plant of this type for municipal sewage and having a four-module unit of the previously-discussed size and capacity is optionally housed in a 21-meter-high building having four levels, as shown in FIG. 18. The upper portion 41 (approximately 10 meters high) of this building is designed to house the 4-module unit, e.g., that shown in FIG. 16. The lowest level 42 is open for access, storage, loading, etc.; it is conveniently about 5 meters high, 10 meters wide and about $11\frac{1}{3}$ meters long. The two middle floors 43 and 44, each about 3 meters high, are for pumps, generators, controls, dials, read-outs, generators, laboratory and offices.

When the effluent is water, as in the preceding example, the unit is advantageously positioned approximately 11 meters above the effluent check valve 19. In this way the weight of the effluent is sufficient to operate the check valve (against atmospheric pressure) and avoids any need for pumping the effluent.

In the description of a working embodiment, reference is made to a number of controls and specialized equipment. Examples of these include, e.g., various metallic-film vapor gauges 26, such as a barium fluoride film; electric hydrometer elements 40 to monitor water-vapor density; samplers 39 to test for methane and other compounds; sensitive thermocouple gauges 24, 25 for accurate temperature and vacuum readings; accurate thermometers 24 to monitor the temperature of the end walls; small recirculating water pumps 28; mechanical rotary vacuum pumps 27 with a base pressure of 0.010 mm Hg for small pressure adjustments; and automatic voltage regulators for a non-fluctuating power source.

With further reference to the preceding illustrative embodiment and to FIG. 1, the temperature of and pressure on the prospective influent in the holding or storage tank supports a column of water of approximately 11 meters. A check valve 29 and a pump 28 are positioned about 10 meters above the level of such prospective influent. Pump 28 automatically propels the influent through nozzle 3 at the desired rate, as sensed, e.g., by appropriate conventional instrumentation.

Pipes 2, 15 and 18 convey influent from a reservoir in the holding or storage tank to and through nozzle 3, pycno to conveyor belt 37 and condensate to trough or conduit 38, respectively.

Compressor 34 preheats influent directed toward nozzle 3, which is manually or automatically adjusted for optimum flow to maintain a saturated vapor condition within module 4.

Influent is vaporized in the module chamber. Heat for evaporation is received radiantly from the liquification at condenser 6.

Powdery residue fall-out 11 is collected in tube 15 and removed, e.g., by a screw conveyor 100 therein, which pushes the solids through one-way valve 12 onto conveyor 37 for disposal. The one-way valve protects established conditions of temperature and pressure within the chamber.

A 10.7 kw fan 8, 4 meters in diameter, is capable, in the rarefied atmosphere of the chamber, of moving water vapor at approximately 140 meters per minute (4.8 mph) toward condenser 6, even were there no other impetus to conduct vapor from nozzle 3 to condenser 6.

The configuration of the far wall at the outlet end of module 4 facilitates the collection of water vapor thereon. Since the vapor is in saturated condition, it continuously liquefies on the cooled condenser. Condensate is then conducted to outlet 10. Most of the heat of condensation is dissipated by radiation, with some conduction to the condensing surfaces (in excess of 13 square meters of surface). The condensate is a constituent of the influent that has been separated from the latter.

Effluent 9 collects in tube 19 until it builds up a head of approximately 11 meters, at which time it balances atmospheric pressure. Any additional effluent 9 entering drain 10 is matched by an equal discharge through valve 19, which is designed to maintain a section of condensate thereover at all times. This assists in maintaining uniform temperature and pressure conditions within the chamber.

The space around each module is filled with a medium, such as pure deaerated water, which receives heat from or transmits heat to the exterior walls of each module by conduction and efficiently circulates by natural convection and by strategically-placed forced convection 32 to stabilize and equalize the temperature throughout each module so that necessary conditions to maintain saturated vapor therein can be sustained.

A vacuum pump 27 is provided in exhaust line 33 to regulate pressure within the chamber for maintaining vapor therein in saturated condition. The vacuum pump is also used to remove methane gas collected within the chamber. The exhaust area is cooled to condense out water vapor before it can be evacuated. Since methane gas cannot condense under prevailing conditions and is more active (12 percent lighter than water vapor), it readily enters exhaust line 33 and is evacuated. In the absence of coolant 35 at the exit to the exhaust line, water vapor passes into the vacuum pump, thus increasing maintenance of that equipment.

The outside shell 31 is insulated with a minimum of 25 mm of polyurethane, which is advantageously sheathed in a fiberglass reinforced cementitious skin. This minimizes effects of outside environment and allows the filler medium, e.g., water, to maximize its inherent "flywheel effect" for stabilizing temperature.

In order to prevent bridging or blocking of the pycno removal line 15, a screw conveyor is provided therein to assure continuous removal of collected solids.

Closer valves 17 (on discharge pipe 15) and 36 (on drain pipe 18) are manually actuated to seal the module chamber from pressure loss when the module is being cleaned out, repaired or otherwise removed from operation.

A very sensitive and accurate thermocouple temperature gauge is advantageously used for thermometer 24. Generally, employed thermo-conductivity gauges comprise Pirani gauges and thermocouple gauges. The Pirani gauges provide a very rapid response to pressure changes. Most Pirani gauges use tungsten wire followed closely by nickel, some with thermistors. Other thermocouple gauges use copper-constantan, cupron-chromel P, etc. All are readily set up to self-record and operate automatic devices. All give different readings for gases and vapors.

Illustrative of suitable hydrostatic gauges are diaphragm gauges, such as a Bourdon gauge. These are sufficiently accurate for the purpose of this invention, can be read remotely and resist corrosive gases. Mercury manometers, such as a McLeod manometer, are also suitable. A refrigerated trap keeps out vapors, thus measuring only gas pressure.

Radioactive-source gauges, such as an Alphatron gauge, have linear response below, through and above working limits required for module 4 and may be calibrated for different gases and vapors. They measure total pressure.

An additional water-vapor measuring device is a barium fluoride film, which is useful to detect methane gas.

A suitable vacuum pump 27 is a Kinney KS-13 rotary oil-sealed pump that has a pumping speed of approximately 1,300 liters/min. at 15 mm of Hg or equivalent.

Water pump 28 is any of a number of conventional commercially-available submersible water pumps having a capacity of 33,000 liters per hour against a head of 8 meters.

Nozzle valve 29 is adjustable to deliver varying liquid flows through a relatively wide range and at substantially-constant pressure. It is also capable of closing off all flow.

Propeller agitators 32 are small motor-driven submerged propellers for circulating liquid filler 30, as required.

A suitable receptacle, e.g. a container, slide or conveyor 37, receives pycno or solids 11 from discharge pipe 15. A corresponding receptacle, e.g. tank, pipeline or channel 38, receives condensate 9 from drain pipe 18.

Hydrometer 40 is any of a number of conventional commercially-available electric hydrometers to measure water-vapor density.

Samplers 39 are conventional devices to detect various gases in the chamber.

A small refrigeration cycle 33, 34 cools condenser 6 and exhaust 33, while its compressor 34 heats influent in conduit 2 on its way to nozzle 3.

Suitable modules are provided in various sizes and combinations. In the preceding illustration the unit has four modules which are positioned with the evaporator end of one adjacent the compressor end of another. The entire system is heavily insulated to minimize system loss and to facilitate heat transfer. All framing is metal, with special care given to preventing corrosion, electrolytic action, etc. Provision is made to compensate for expansion and contraction of the respective members. The use of non-compressible liquid filler significantly contributes to implementing the latter. As with the filler, all other materials that are exposed to the vacuum are deaerated.

As viruses only reproduce in a living cell and are particularly susceptible to environmental changes, subjecting them to sudden material temperature and/or pressure changes, as occurs on introduction to a chamber of the type of module 4, results in a substantially 100 percent kill ratio due to their internal osmotic pressure alone; such pressure causes them to explode and die. The process of this invention is thus useful, e.g., to produce vaccine from an isolated virus.

When plural modules are combined in a single unit, various alternative arrangements are available for feed and discharge lines. All such lines are optionally independent or suitably combined. The arrangement shown in FIG. 16 illustrates having combined feed lines 2 for a pair of units and combined discharge lines 18 for a pair of units, but individual discharge pipes 15 for each unit. FIG. 17 illustrates a four-module unit wherein a single feed line supplies influent to all four modules; a common condensate discharge line and a common pycno discharge line for all four modules are also provided. The arrangements shown in FIGS. 16 and 17 are merely illustrative; numerous other arrangements are readily available.

The example relating to fluid influent involves aqueous material and a process for extracting substantially pure water therefrom. The pressure and temperature conditions are determined to a large extent on the nature of the medium and the constituent therein which is vaporized and condensed. The process is equally applicable to all sorts of liquid industrial wastes, almost without regard to the particular liquid which is being vaporized and subsequently condensed. Naturally, for liquids other than water the pressure and temperature conditions within each module have to be appropriately fixed. Such is readily accomplished by conventional determinations that are readily available to the artisan. When temperature conditions are changed, some change may be required in the nature of the filler medium in the space surrounding each module. This also is readily accomplished by those skilled in the art from readily-available knowledge.

The process is not in any way limited to liquid influent. Substantially the same process (with minor modification in structure) is readily applicable to extract from solids a liquid or other substituent which is vaporizable and liquifiable. To provide a way of continuous introduction of such a solid into a module, a special feeding mechanism 50, as shown in FIGS. 6 and 7, is provided.

The receiving mechanism has three distinct sections: a receiving conduit 51, a discharging conduit 52 and a space spiral 53. Both receiving conduit 51 and discharging conduit 52 have internal rifling corresponding to and constituting a continuation of the double helix 54 (as shown in FIG. 10) of space spiral 53. [In an alternative, but less desirable, embodiment the entire receiving mechanism has 3 or 4 straight, equally-spaced, parallel tracks.] Support for the space spiral is provided by 4 ribs 55 (shown in FIGS. 7, 10 and 11), each of which is bound at opposite ends to receiving conduit 51 and to discharging conduit 52. The ribs are advantageously spaced 90° apart around the space spiral.

In order to process solid stock containing a liquid or liquifiable constituent with this feeding mechanism, the solid stock must be prepared (cored, extruded, cut by lasers or otherwise shaped and radially grooved (to match and fit into receiving conduit 51). The grooves 57 in shaped stock 56 must match ridges 58 in receiving conduit 51.

As in the case of liquid influent and the operation of module 4, best results are obtained by stabilizing the temperature and process of module (extractor) 59 prior to processing any solid feed therein. Generally processing temperature will not be less than ambient temperature of the solid stock.

To stabilize the temperature and pressure within the chamber of module 59, the inlet and outlet of feeding mechanism 50 must be closed. Such closure is effected by a plug 60, which is slightly longer than feeding mechanism 50, which has an external diameter substantially the same as, but slightly less than, the internal diameter of receiving conduit 51 and which has a double-spiral helical groove corresponding to and matching the rifling on the interior of receiving conduit 51. Plug 60 is designed to block both receiving conduit 51 and discharging conduit 52 and yet to move smoothly through feeding mechanism 50 when rotated slightly in the direction of the rifling.

With plug 60 in place, suitable conditions are established within the chamber of module 59 to liquify, boil and/or sublime a constituent of solid stock 56, which is to be processed in module 59. The process is designed to effect substantially complete extraction of the desired constituent from the shaped stock while the stock is passing through space spiral 53 of feeding mechanism 50. Rotation of the shape stock through this portion of feeding mechanism 50 permits a more-uniform exposure of all portions of the stock to conditions within the module chamber. Predetermined desired pressure and temperature conditions are preliminarily established for extracting the desired constituent from the shaped stock 56 to be processed. Pressure conditions are established within the module chamber in the same manner as previously discussed in connection with module 4. Temperature conditions are established by heating (if necessary) filler fluid 61 in the space surrounding each module. Also, the shaped stock 56 is heated to the temperature at which it is to be processed even before it is charged into feeding mechanism 50. Gases are evacuated and vapors are stabilized under saturated-vapor conditions in the same manner as discussed in connection with the fluid cycle. A volume mover 62 is similarly provided to perpetuate a saturated-vapor condition by propelling formed vapor toward condenser 63. A refrigeration cycle (heat pump 64, 65) comprises a compressor 64 (used to heat solid shaped stock in receiving conduit 51) and a vaporizer to distribute coolant 65 around exhaust exit 66 and adjacent condenser 63. The coolant around exhaust exit 66 protects the vacuum pump (not shown) in the same manner as previously discussed in connection with module 4. Similarly, the coolant adjacent condenser 63 assists in the condensing function in the same manner as discussed with regard to the operation of condenser 6 of module 4. In fact the basic operation of module 59 completely parallels that of module 4. Condensate 67 from condenser 63 collects in drain 164 in the same manner as condensate 9 collects in drain 10 in the operation of module 4.

Grooved cylindrical stock 56 is accurately cut into standard lengths (approximating the length of space spiral 53). The exterior surface of solid stock 56 is grooved so that the shaped stock rotates at least one full revolution during its passage through space spiral 53 in the chamber of module 59. Ridges 58 of receiving conduit 51 continue through the chamber like a space frame and further continue into and through discharging conduit 52.

When shaped stock 56 is introduced into receiving conduit 51, it is rotated in a manner which pushes before it plug 60. Following each section (as shown in FIG. 12) of shaped stock, a cermet divider 68 is used as a follower. The cermet divider is sized and externally grooved to follow the spiral path through feeding mechanism 50. Immediately behind the cermet divider a second length of shaped stock 56 is charged into feeding mechanism 50. Each length of shaped stock 56 is followed by a cermet divider 68 until the final length of shaped stock for a given run has been thus charged. At that point in the process, a specially-constructed grooved metal cylinder (plug 60) is pushed through feeding mechanism 50 with the final length of shaped stock 56 immediately preceding it. Thus, shaped stock is continuously charged through feeding mechanism 50 in as rapid succession and for an extended a period as desired. The chamber of module 59 is sealed from ambient conditions by sections of shaped stock 56 and/or by plug 60.

To determine initial conditions for the chamber of module 59 with any particular shaped stock, a representative sample of each batch of source material is analyzed and a procedure is formulated to be operated manually, programmed for control by computer or a mix of both.

Any component of the solid stock which is extracted therefrom may comprise a vaporizable and condensable fraction as well as one or more other fractions. Components may be withdrawn from module 59 in the form of solids, crystals, liquids and/or gases and vapors. It is not unusual to have a separation of two different liquids rather than a solid/liquid separation, as in the normal operation of module 4. A liquid or solid discharge may be removed through collector 69. When two liquids are separated, one or both may require pumping. It may be advantageous, e.g., to have a centrifugal pump 70 in collector 69 and a submersible pump 71 for drain 164.

Liquid, a liquid-solid mix or solids may be collected in collector 69 directly beneath space spiral 53. As previously indicated, collector 69 may require a pump. However, when solids or a mixture of liquids and solids is discharged through collector 69, a screw mechanism, such as that described in connection with discharge pipe 15, may be more appropriate and is optionally provided in connection with module 59. Certain vapors may liquify on condenser 63 and be removed as in the fluid cycle, but still require to be pumped out through drain 164, depending upon their density.

Sensors (electric pressure gauge 75, thermal pressure gauge 76 and thermometer 77) often need to be more sophisticated in the processing of solid stock than their counterparts in the corresponding processing of liquid influent since, in nearly all cases, gases and/or vapors have to be evacuated through exhaust exits 66. As each devoided shaped stock is ejected from discharging conduit 52, it is severely fractured and often practically pulverized when atmospheric pressure slams into its pores and fissures.

As with the liquid process, the solid process is optionally performed in 4 flip-flop chambers (positioned as shown in FIGS. 16 and 17), which are appropriately offset to accommodate receiving conduits 51 and discharging conduits 52. It, like the fluid process, has the area surrounding each chamber filled with an appropriate fluid 9, such as a deaerated aqueous solution, and has propeller agitators 78 appropriately positioned and immersed in such liquid for forced convection. The entire assembly is insulated by a shell 79. The exhaust exit and immediate surrounding area are refrigerated by coolant 65, as is condensing surface 63. Cooling the exhaust exit prevents condensable vapors from passing through the exhaust pump (not shown), since condensation occurring in such pump necessitates excessive maintenance. Coolant 65 is condensed by compressor 64.

A particularly advantageous use of the solid process is to extract petroleum from shale. The process has a negligible effect on environment and consumes a small fraction of the energy required by existing methods.

Even though normal octanes, normal heptanes and other possible shale constitutents boil at 17.5 mm Hg and 20° C., the particular shale being processed contains some asphalt and thus requires modifying the environment of the chamber to 0.8 mm of Hg and to a temperature of 175° C. Filler 61 has sufficient ethylene glycol or other appropriate substance mixed with water to raise its boiling point to approximately 185° C. Filler 61 is contained within inflexible shell 79, which acts as a pressure vessel.

The physical plant is of the modification designed to receive solids, as illustrated in FIG. 6. The shale is cut by lasers and then fluxed and soaked with oil to suit the particular raw material. The cutting of the cylindrical shape is effected by describing a circular path with a laser beam; the end cuts are made by a beam travelling in a straight line. The prepared shaped stock 56 has two radial helical grooves cut in it. Cermet dividers 68 are flat round pieces with notches 79 to match grooves 57 in shaped stock 56. Receiving conduit 51 and discharging conduit 52 have spiral internal rails or ridges 58 which fit into grooves 57 of shaped stock 56. These conduits are placed at an angle which describes a straight path through the chamber of module 59. The conduits themselves only extend a short distance, e.g. several inches, into each side of the chamber of module 59, but space spiral 53 (stiffened by four parallel fins 55) completes feeding mechanism 50 by bridging the gap between receiving conduit 51 and discharging conduit 52 so that the totality of the feeding mechanism runs completely through the chamber of module 59. The shaped stock 56 is preferably fed from a higher elevation to a lower one and is advantageously rotated while sliding down or traversing the incline. Depending upon the actual angle, some minimal power is often required to speed up the slide. The rate of traversal through the chamber is increased or decreased as desired; it is regulated manually or by preprogrammed computer controls. A plug 60 is inserted in feeding mechanism 50 when the process is initiated or stopped. This plug has the same diameter and grooves as shaped charge 56, but is longer and extends from a few inches outside of receiving conduit 51, down through the chamber to a position which is several inches beyond the opposite end of discharging conduit 52. To start the process, plug 60 is inserted through receiving conduit 51 into this position. It is followed by a section of shaped stock 56. The environment having been previously established, processing begins. A cermet divider 68 is placed behind the first section of shaped stock 56 to seal it off from the following section of shaped stock. Alternate sections of shaped stock and cermet dividers are then continually fed into feeding mechanism 50 until the end of the run, which may take hours, days or months. As shaped stock 56 travels through the chamber of module 59, it is continually rotating. Liquid or liquefiable components therein liquefy, boil and/or sublime, dripping and/or evaporating from shaped stock 56. When the shaped stock is devoided of the constituents which are being extracted therefrom, it continues through discharging conduit 52 and into the atmosphere, where cermet divider 68 falls off and is retrieved for reuse. When the devoided shale (56) is again subjected to atmospheric pressure, such pressure slams into evacuated pores and fissures and practically pulverizes the devoided shale. In the meantime, liquefied extract, possibly mixed with some solids, drips or falls down to collector 69, from which it is evacuated by gravity, such as the process for withdrawing liquid from drain pipe 18, or other suitable process. Vapor produced from constituents of shaped stock 56 is liquefied at condenser 63, collected in drain 164 and evacuated in the same manner as the corresponding condensate in drain pipe 18.

Natural gases are pumped through exhaust exit 66 and stored in suitable tanks. The entire process is performed continuously by manual controls and/or automatically by computers programmed for each batch or series of batches. When a run is completed, the long metal cylinder of plug 60 is reinserted directly behind the last section of shaped stock 56 and run through feeding mechanism 50 until it is substantially centrally positioned in that mechanism.

Collected natural gas is dried if it contains water vapor. Liquid petroleum removed through collector 69 is separated from any solids therewith; gravitational separation is ordinarily employed for this purpose. If any salt crystals are present, they are suitably removed. Separated petroleum is used as such or further processed as desired. Condensate 67 is also used as obtained or further appropriately processed. Further processing is, e.g., effected in the previously-discussed liquid process to preserve the integrity of such products, since many experience serious quality degradation when processed at high temperatures. Moreover, energy requirements of processing in the subject liquid process are considerably less.

The shattered shale residue is useful, e.g., to backfill mines and as road aggregate.

Many elements for the solid process are the same or virtually the same as their counterparts in the fluid process and thus require no further description. A number of the elements, however, are unique. Some of these, as well as others, are briefly considered.

Receiving conduit 51 is placed on an incline to facilitate conveying shaped stock 56 (shale) into the chamber of extractor 59.

Discharging conduit 52 receives shaped stock 56 from space spiral 53 in the rarified environment of the chamber and conveys the shaped stock from the chamber of module 59 into the atmosphere outside of that module.

Space spiral 53 is stiffened and supported by four parallel fins 55. Its double helix serves to rotate shaped stock 56 for optimum drainage and evaporation as the shaped stock travels through the chamber of module 59 in the devoiding process.

The environment of the extraction chamber of module 59 is established for optimum melting, boiling and/or subliming constituents of shaped stock 56 in order to devoid such shaped stock of relevant constituents.

Collector 69 receives drippings from shaped stock 56. Such drippings may or may not include solids and/or crystals. Insofar as possible the drippings are removed through collector 69 to receptacle 80. Collector 69 optionally has within it a worm screw or other device to conduct unduly viscous drippings or mixtures of drippings with solids. This collector (with or without such a worm screw) is optionally heated to facilitate transmission of materials passing therethrough. Pump 70 is also optionally provided to remove materials passing through the collector. Shut-off valve 82 (similar to valve 17) is provided near the inlet of collector 69. Like its counterpart, it is manually operated.

Volume mover 62 is almost always used to assist in moving gases and vapors toward exhaust port 66 and condenser 63, since exiting momentum of gases from shaped stock 56 is essentially radial and must therefore be directed towards exhaust 66 and condenser 63, as well as being attracted by continuous negative pressure.

The configuration of the far end of condenser 63 facilitates liquification of petroleum vapors in contact therewith. Condensed petroleum flows over the condensing surface to drain 164. Most of the heat of condensation is instantly transferred to shaped stock 56 by radiation.

Drain 164 is substantially outfitted in the same way as its counterpart in the fluid process, but it incorporates a pump 71 to remove condensate 67 rather than to rely completely on gravity because of the possibility of relatively-low densities. This drain empties into receptacle 81.

Medium 61 comprises ethylene glycol mixed with deaerated water and proportioned not to boil below 185° C.

The same Kinney KS-13 pump, refrigerated areas and operating principles as used in the fluid process are suitable for exhaust 66.

Shell 79 is the same as shell 31.

Lighter oil fractions are separable from condensate 67 by subjecting such condensate to the fluid process and establishing appropriate saturated-vapor conditions in module 4.

The shaped stock 56 must be accurately shaped, grooved and properly treated to fit feeding mechanism 50.

Cermet dividers 68 are round discs with notches to accommodate rifling 58 and double helix 54. They must also separate and seal off individual sections of shaped stock 56 from each other. They are reusable.

Special spiral cylinder or plug 60 is a permanent reusable steel cylinder that is machined to fit feeding mechanism 50 and to be passed therethrough readily.

Pump 70 is a commercially-available centrifugal pump that is capable of pumping a suitable proportion of solids without clogging.

Submersible pump 71 is similar to pump 28 in the fluid process.

Receptacle 80 is, e.g., a tank, pipeline or sluice for removing the content of collector 69.

Receptacle 81 is, e.g., a tank, pipeline or sluice for removing condensate from drain 164.

Pressure gauges 75, 76 and thermometers 77 are similar to those disclosed for the fluid process.

The preceding example for processing shaped solid stock involves the use of a four-module unit arranged in the manner shown in FIG. 16 or FIG. 17. Even though FIGS. 16 and 17 depict a system suitable for the fluid process, the identical arrangements are useful for the solid process with a single change; for the solid process an individual feeding mechanism must be provided for each module.

The invention and its advantages are readily understood from the preceding description. It is apparent that various changes may be made in the processes and apparatus without departing from the spirit and scope of the invention or sacrificing its material advantages. The processes and apparatus hereinbefore described are merely illustrative of preferred embodiments of the invention.

I claim:

1. A substantially-closed horizontally-disposed hollow module having a single chamber with an inlet means and an outlet means at opposite ends, with a substantially unimpaired path extending from the inlet means to the outlet means, with discharge means at the inlet end below or downstream from the inlet means, with vertically-disposed condensing means at the outlet end, with means to maintain a substantially constant temperature throughout the chamber, with vacuum means (a) to vaporize a component of influent introduced through the inlet means, (b) to maintain a substantially constant pressure throughout the chamber and (c) to produce and maintain a saturated-vapor atmosphere of the component throughout said chamber at the substantially-constant temperature, and with supplementary means, separate and distinct from the vacuum means, to assist in initiating and/or maintaining flow of the saturated vapor from the inlet means to the condensing means, the single chamber having a substantially circular cross-section, providing a flow path for the saturated vapor which is substantially constant in cross-sectional area from the inlet means to the condensing means and having a length at least as great as its diameter.

2. A module according to claim 1 wherein the condensing means comprises means to radiate heat of condensation to the inlet means and thus to influent introduced therethrough.

3. A module according to claim 2 wherein said condensing means comprises means to reduce the volume of saturated vapor at the outlet end sufficiently to draw saturated vapor continuously from the inlet end toward the outlet end when influent is continuously introduced through the inlet means.

4. A module according to claim 1 wherein the vacuum means is means to maintain a substantially constant pressure within the range of from $10^{-3}$ to 25 mm of Hg throughout the chamber.

5. A substantially closed module having
(a) a hollow interior,
(b) opposed end walls providing an inlet end and an outlet end joined by a single substantially-cylindrical horizontally disposed section defining a substantially-uniform flow path which is circular in cross-section, the end walls being separated by a distance which is at least as great as the diameter of the cylindrical section,
(c) inlet means for introducing influent into the module at the inlet end,
(d) vacuum means to vaporize a component of the influent as said influent passes through the inlet means into the hollow module and to maintain saturated vapor of the component virtually uniformly distributed throughout the interior of the module, the vacuum means comprising means to separate said component from other components of said influent,
(e) discharge means at the inlet end below or downstream of the inlet means to withdraw from the module non-vaporized components of the influent,
(f) vertically disposed condensing means to condense vapor of the component at the outlet end,
(g) means to withdraw condensate from the outlet end, and
(h) means to regulate the influent to replace saturated vapor condensed by the condensing means and thus maintain a "flywheel" effect for the flow of saturated vapor from the inlet means to the condensing means.

6. A module according to claim 5 having means to assist in conveying saturated vapor continuously and uniformly from the inlet means toward the condensing means.

7. A module according to claim 5 wherein the inlet means comprises conduit means for conveying a shaped (liquid- or liquefiable-component)-containing solid through the module at the inlet end.

8. A substantially-closed hollow module immersed in liquid medium means to assist in maintaining it at constant temperature, the module having a substantially circular cross-section and a length at least as great as its diameter, having a single chamber with an inlet means and an outlet means at opposite ends, with a substantially unimpaired path extending from the inlet means to the outlet means, with discharge means at the inlet end below or downstream from the inlet means, with condensing means at the outlet end, with means to maintain a substantially constant temperature throughout the chamber, with vacuum means (a) to vaporize a component of influent introduced through the inlet means, (b) to maintain a substantially constant pressure throughout the chamber and (c) to produce and maintain a saturated-vapor atmosphere of the component throughout said chamber at the substantially-constant temperature, and with supplementary means, separate and distinct from the vacuum means, to assist in initiating and/or maintaing flow of the saturated vapor from the inlet means to the condensing means, the single chamber providing a flow path for the saturated vapor which is substantially constant in cross-sectional area from the inlet means to the condensing means, the condensing means comprising means to radiate heat of condensation to the inlet means and thus to influent introduced therethrough and means to reduce the volume of saturated vapor at the outlet end sufficiently to draw saturated vapor continuously from the inlet end toward the outlet end when influent is continuously introduced through the inlet means.

9. A module according to claim 8 encased in means to insulate the liquid medium means from ambient conditions.

10. A module according to claim 9 having an outlet to the vacuum means and combined heating and cooling means, the heating means comprising means to heat influent introduced through the inlet means and the cooling means comprising means to cool the outlet to the vacuum means and the condensing means.

11. A module according to claim 9 wherein the cross-sectional area of the saturated-vapor flow path corresponds to that of a circle having a diameter which is in the range of from about 0.25 to about 0.4 of the length of the module.

12. A module according to claim 9 wherein the inlet means is means for introducing liquid into the module, and the vacuum means is means for converting the liquid, as it is introduced into the module, into saturated vapor and pycno.

13. A module according to claim 7 wherein the inlet means comprises conduit means for conveying a shaped (liquid- or liquefiable-component)-containing solid through the module at the inlet end.

14. A module according to claim 13 wherein the conduit means has track means for turning the shaped solid as it is conveyed through said conduit means.

15. A module according to claim 14 wherein the conduit means is at an angle to both horizontal and vertical axial planes of the module and is means for conveying said shaped solid from a higher elevation to a lower elevation across said module.

16. Plural modules according to claim 8 immersed in liquid medium means to assist in maintaining them at constant temperature and encased in common means to insulate the liquid medium means from ambient conditions, the plural modules being juxtaposed so that the inlet means of each is adjacent the outlet means of another.

17. Plural modules according to claim 16 wherein four modules are juxtaposed, two above two, in the liquid medium means and within common insulating means so that the inlet means of each is above or below the outlet means of the other module having substantially the same axial vertically-bisecting plane.

18. A substantially-closed module immersed in liquid medium means to assist in maintaining it at constant temperature and having
    (a) a hollow interior,
    (b) opposed end walls providing an inlet end and an outlet end joined by a single substantially-cylindrical section defining a substantially-uniform flow path which is circular in cross-section, the end walls being separated by a distance which is at least as great as the diameter of the cylindrical section,
    (c) inlet means for introducing influent into the module at the inlet end,
    (d) vacuum means to vaporize a component of the influent as said influent passes through the inlet means into the hollow module and to maintain saturated vapor of the component virtually uniformly distributed throughout the interior of the module, the vacuum means comprising means to separate said component from other components of said influent,
    (e) discharge means at the inlet end below or downstream of the inlet means to withdraw from the module non-vaporized components of the influent,
    (f) condensing means to condense vapor of the component at the outlet end,
    (g) means to withdraw condensate from the outlet end, and
    (h) means to regulate the influent to replace saturated vapor condensed by the condensing means and thus maintain a "flywheel" effect for the flow of saturated vapor from the inlet means to the condensing means.

19. A module according to claim 18 encased in means to insulate the liquid medium means from ambient conditions.

20. A module according to claim 19 having an outlet to the vacuum means and combined heating and cooling means, the heating means comprising means to heat influent introduced through the inlet means and the cooling means comprising means to cool the outlet to the vacuum means and the condensing means.

21. A module according to claim 19 wherein the cross-sectional area of the saturated-vapor flow path corresponds to that of a circle having a diameter which is in the range of from about 0.25 to about 0.4 of the length of the module.

22. A module according to claim 19 wherein the inlet means is means for introducing liquid into the module, and the vacuum means is means for converting the liquid, as it is introduced into the module, into saturated vapor and pycno.

23. A module according to claim 19 wherein the inlet means comprises conduit means for conveying a shaped (liquid- or liquefiable-component)-containing solid through the module at the inlet end.

24. A module according to claim 23 wherein the conduit means has track means for turning the shaped solid as it is conveyed through said conduit means.

25. A module according to claim 24 wherein the conduit means is at an angle to both horizontal and vertical axial planes of the module and is means for conveying said shaped solid from a higher elevation to a lower elevation across said module.

26. Plural modules according to claim 5 immersed in liquid medium means to assist in maintaining them at constant temperature and encased in common means to insulate the liquid medium means from ambient conditions, the plural modules being juxtaposed so that the inlet means of each is adjacent the outlet means of another.

27. Plural modules according to claim 26 wherein four modules are juxtaposed, two above two, in the liquid medium means and within common insulating means so that the inlet means of each is above or below the outlet means of the other module having substantially the same axial vertically-bisecting plane.

28. A process for separating a vaporizable and liquifiable component from material having plural components and which comprises:
    continuously introducing the material through an inlet into and simultaneously vaporizing the vaporizable component in an enclosed vaporization zone which provides a substantially constant flow path of circular cross-section from the inlet to a vertically-disposed condenser at opposite ends,
    maintaining said vaporizable component in saturated-vapor form virtually throughout the vaporization zone,
    conducting the saturated vapor laterally at a substantially constant and continuous rate of flow from said inlet to the condenser,
    continuously producing condensate at the condenser end in an amount which substantially corresponds to that of said vaporizable component which is present in material concurrently introduced into said vaporization zone through the inlet.

29. A process which comprises:
    introducing a vaporizable-component-containing material to the inlet end of a horizontally-disposed chamber of substantially circular cross-section having an inlet end and an outlet end at opposite ends thereof and having a substantially constant flow path,
    vaporizing the vaporizable component on introduction of the material into the chamber to separate said component from other components of the material and to produce a saturated vapor of that component throughout the chamber,
    maintaining the saturated vapor throughout the chamber, continuously conducting the saturated vapor from the inlet end to the outlet end,
    condensing said saturated vapor at a vertically disposed condenser at the outlet end to produce liquid in a purified form and
    withdrawing the purified liquid as condensate from the outlet end at a rate substantially equal to that at which said vaporizable component is introduced into the inlet end of the chamber in the vaporizable-component-containing material.

30. A process according to claim 29 which comprises maintaining substantially constant the flow rate of saturated vapor from the inlet end to the outlet end, the temperature within the chamber and the pressure within the chamber.

31. A process according to claim 30 which comprises radiating heat of condensation from the outlet end to the inlet end of the chamber.

32. A process according to claim 31 which comprises withdrawing from the inlet end of the chamber substance comprised in the vaporizable component-containing material and not retained by the saturated vapor conducted to the outlet end of the chamber.

33. A process according to claim 32 which comprises maintaining the saturated vapor under a pressure within the range of from $10^{-3}$ to 25 mm of Hg.

34. A process according to claim 33 which comprises maintaining the saturated vapor at a temperature within the range of from about 0° to about 250° C.

35. A process according to claim 32 wherein the vaporizable component-containing material is substantially liquid in nature.

36. A process according to claim 32 wherein the vaporizable component-containing material is substantially solid in nature.

37. A process according to claim 32 which comprises withdrawing non-condensable gas from the chamber.

38. A process according to claim 32 which comprises heating the vaporizable component-containing material prior to introducing it into the chamber.

39. A process according to claim 32 which comprises maintaining the chamber immersed in a substantially incompressible liquid having a high specific heat.

* * * * *